(12) United States Patent
McKay (10) Patent No.: US 12,117,080 B2
(45) Date of Patent: Oct. 15, 2024

(54) GASKET ASSEMBLY AND SEAL CARRIER

(71) Applicant: SUBSEA TECHNOLOGIES GROUP LIMITED, Aberdeen (GB)

(72) Inventor: David Ernest McKay, Aberdeenshire (GB)

(73) Assignee: Subsea Technologies Group Limited, Aberdeen (GB)

( * ) Notice: Subject to any disclaimer, the term of this patent is extended or adjusted under 35 U.S.C. 154(b) by 104 days.

(21) Appl. No.: 17/613,354

(22) PCT Filed: May 22, 2020

(86) PCT No.: PCT/GB2020/051256
§ 371 (c)(1),
(2) Date: Nov. 22, 2021

(87) PCT Pub. No.: WO2020/234610
PCT Pub. Date: Nov. 26, 2020

(65) Prior Publication Data
US 2022/0221057 A1    Jul. 14, 2022

(30) Foreign Application Priority Data
May 23, 2019   (GB) ..................................... 1907304

(51) Int. Cl.
*F16J 15/08*   (2006.01)
*F16J 15/06*   (2006.01)
(Continued)

(52) U.S. Cl.
CPC ......... *F16J 15/0887* (2013.01); *F16J 15/061* (2013.01); *F16J 15/002* (2013.01); *F16L 23/18* (2013.01)

(58) Field of Classification Search
CPC ...... F16J 15/0887; F16J 15/061; F16J 15/002; F16J 23/18
See application file for complete search history.

(56) References Cited

U.S. PATENT DOCUMENTS 3,930,656 A * 1/1976 Jelinek .................... F16L 23/18
                                                    277/611
4,272,109 A * 6/1981 Ahlstone ................. F16L 23/18
                                                    285/379
(Continued)

FOREIGN PATENT DOCUMENTS

EP    2 366 919 A2    9/2011
EP    2 828 560 B1    1/2015
(Continued)

*Primary Examiner* — Vishal A Patel
(74) *Attorney, Agent, or Firm* — Foley & Lardner LLP (57) ABSTRACT

The present invention concerns a gasket assembly (1) for sealing between conduits passing through two respective bodies. The gasket assembly comprises a primary seal (10), wherein the primary seal comprises a first sealing surface (14) adapted to form a seal with the first body of said respective bodies, and a second sealing surface (15) adapted to form a seal with the second body of said respective bodies. The primary seal is coupled to a primary seal carrier (30), the primary seal carrier comprising one or more secondary seals (43a, 43b), the one or more secondary seals being adapted to form a seal with one or more of the first and second bodies.

15 Claims, 5 Drawing Sheets

(51) Int. Cl.
   *F16J 15/00*          (2006.01)
   *F16L 23/18*          (2006.01)

(56)           References Cited

U.S. PATENT DOCUMENTS

| | | | | |
|---|---|---|---|---|
| 4,494,762 | A * | 1/1985 | Geipel | F16J 15/48 |
| | | | | 277/614 |
| 5,145,219 | A * | 9/1992 | Babuder | F16L 19/0212 |
| | | | | 285/379 |
| 5,366,261 | A * | 11/1994 | Ohmi | F16L 19/0212 |
| | | | | 285/379 |
| 5,570,911 | A * | 11/1996 | Galle | F16L 23/167 |
| | | | | 285/379 |
| 5,904,381 | A * | 5/1999 | Ohmi | F16L 23/16 |
| | | | | 285/379 |
| 6,032,958 | A | 3/2000 | Fowler | |
| 6,241,254 | B1 * | 6/2001 | Gromyko | F16L 17/03 |
| | | | | 285/368 |
| 8,662,504 | B2 * | 3/2014 | Kariya | F16J 15/061 |
| | | | | 277/609 |
| 2011/0031745 | A1 * | 2/2011 | Nakata | F16L 19/025 |
| | | | | 285/379 |

FOREIGN PATENT DOCUMENTS

| | | |
|---|---|---|
| GB | 1 322 269 A | 7/1973 |
| JP | 2003-014172 A | 1/2003 |
| KR | 20180058975 A | 6/2018 |
| WO | WO-2018/105798 A | 6/2018 |

* cited by examiner

GASKET ASSEMBLY AND SEAL CARRIER

CROSS-REFERENCE TO RELATED APPLICATIONS

This application is a U.S. National Stage Application under 35 U.S.C. § 371 of International Patent Application No. PCT/GB2020/051256, filed on May 22, 2020, which claims priority to United Kingdom Patent Application No. 1907304.8, filed on May 23, 2019, the disclosure of each of which is incorporated herein by reference in their entireties The present invention relates particularly but not exclusively to a gasket assembly and a seal carrier for a conduit, particularly a gasket assembly comprising a primary seal and one or more secondary seals. Examples of the invention can typically be useful for sealing between sections of conduit carrying high-pressure and/or high-temperature liquids or gases, particularly in oil and gas applications.

BACKGROUND TO THE INVENTION

Gaskets allow a reliable compression seal to be made between two surfaces. Most commonly, a gasket is a shaped sheet of non-metallic, often slightly pliable, material that is placed between two surfaces which are then brought together and secured to one another in order to form a compression seal. The purpose of the gasket is to fill any slight irregularities in one of, or both, of the two sealing surfaces that form the seal, thereby preventing any leaks through the seal that might otherwise occur.

In addition to the seal between two surfaces provided by a gasket, some apparatus also employs a secondary seal adjacent to the primary gasket seal. A secondary seal can be used in conjunction with a primary gasket seal for several different purposes, including for providing a redundant backup to the primary gasket seal, should the primary gasket seal leak or otherwise fail.

An RTJ (ring-type joint, alternatively known as a ring gasket) is a particular type of gasket that is commonly used to seal between sections of pipe, and which is well-suited to high-pressure and/or high-temperature applications. Typically, an RTJ is fitted between the flanged ends of two sections of pipe, and then compressed between the two pipe sections in order to complete the seal between the two pipe sections. In contrast to common gaskets, RTJs are often metallic, and the seal thus formed is therefore a metal-to-metal seal.

The compression required to seal two surfaces, such as the flanged ends of two pipe sections, with a gasket is often provided by fixed, non-releasable connectors, commonly by bolts fitted through the flanged ends of the pipes. However, in some applications, particularly in oil and gas applications, it may be desirable to allow the pipe sections sealed by a ring-type gasket to be separated on demand, and then subsequently re-connected, without the difficulty of removing, and then replacing, fixed connectors such as bolts. For example, a marine riser pipe carrying high-pressure fluid between a floating surface vessel and a wellhead on the seabed must allow for emergency disconnection from the wellhead if the surface vessel drifts significantly out of position above the wellhead, and then allow for subsequent re-connection of the riser to the wellhead. Such emergency disconnection systems are known.

The metal-to-metal seal formed by an RTJ is created by means of a high compressive load during make-up of the connection which causes localised plastic deformation of the gasket against the mating seat surfaces. An alternative to this design is a lip-type gasket in which the combination of the gasket material together with the interface geometry of the gasket and its mating seat surfaces creates sufficient metal-to-metal contact pressure to create a seal while remaining largely within the limits of elastic deformation of the gasket material. Such gaskets are therefore suitable for multiple connection make-ups.

The present invention seeks to provide a lip-type gasket assembly for sealing between pipes or conduits that is less expensive and easier to manufacture, and which also allows a reliable seal to be formed during each one of several separation/re-connection cycles, while retaining the advantages provided by the inclusion of a secondary seal in addition to the primary gasket seal.

SUMMARY OF THE INVENTION

According to the present invention, there is provided a gasket assembly for sealing between conduits passing through two respective bodies, the gasket assembly comprising: a primary seal, wherein the primary seal comprises a first sealing surface adapted to form a seal with the first body of said respective bodies, and a second sealing surface adapted to form a seal with the second body of said respective bodies; and
   a primary seal carrier, wherein the primary seal is coupled to the primary seal carrier, and wherein the primary seal carrier comprises one or more secondary seals, the one or more secondary seals being adapted to form a seal with one or more of the first and second bodies.

The present invention therefore provides the advantages of a gasket assembly having one or more secondary seals, without the disadvantages such as material costs and associated machining requirements of producing a primary seal which incorporates an integrated secondary seal.

Optionally the conduits passing through the two bodies each have a central axis, and optionally the axes of the conduits passing through the two bodies are coaxial when the conduits are sealed. Optionally the first and second sealing surfaces of the primary seal are angled with respect to the axes of the conduits. Optionally the first and second bodies form a seal with the primary seal by moving in opposing axial directions with respect to the primary seal, optionally by approaching the primary seal from opposing axial directions. Optionally the first and second sealing surfaces of the primary seal form a seal by compression with the sealing surfaces of the first and second bodies as the first and second bodies are compressed, optionally axially compressed, against the primary seal.

Optionally the primary seal is annular, and optionally the primary seal carrier is annular. Optionally a radially outer surface of the primary seal engages with a radially inner surface of the primary seal carrier, such that the primary seal carrier optionally restricts, but does not prevent, movement of the primary seal with respect to the primary seal carrier in a radial direction.

Optionally a portion of the radially outer surface of the primary seal radially overlaps with a portion of the radially inner surface of the primary seal carrier, such that the primary seal carrier optionally restricts, but does not prevent, movement of the primary seal with respect to the primary seal carrier in an axial direction. Optionally the primary seal carrier is formed from a different material from the material of the primary seal, which is optionally a lower value material than the material of the primary seal. Optionally the material which forms the primary seal carrier has different physical properties from those of the material which forms the primary seal. Optionally the material which forms the primary seal has improved temperature- and/or pressure-tolerance over the material which forms the primary seal carrier. Optionally the material which forms the primary seal has greater corrosion resistance over the material which forms the primary seal carrier.

The position of the primary seal carrier is optionally fixed with respect to one of the first and second bodies. Optionally the radial and/or axial movement of the primary seal with respect to the primary seal carrier allows for optimum alignment of the first and second sealing surfaces of the primary seal with the respective sealing surfaces of the first and second bodies, which optionally improves the integrity of the seal between the primary seal and the sealing surfaces of the first and second bodies. Optionally, the movable coupling of the primary seal with respect to the primary seal carrier allows multi-directional alignment of at least one of the first and second sealing surfaces of the primary seal with at least one of the first and second bodies.

Optionally the primary seal is formed from a metal, optionally from a metal alloy, optionally from a corrosion-resistant metal alloy such as Inconel. Optionally the first and second bodies are formed from a steel alloy. Optionally the sealing surfaces of the first and second bodies are formed from an inlay of a different material from the first and second bodies, which is optionally a corrosion-resistant metal alloy such as Inconel.

Optionally a surface, optionally a radially outer surface, of the primary seal and a surface, optionally a radially inner surface, of the primary seal carrier form a channel, which optionally allows fluid communication between a surface portion of the first body isolated intermediate the primary seal and the first secondary seal, and a surface portion of the second body isolated intermediate the primary seal and the second secondary seal. Optionally the channel between the primary seal and the primary seal carrier is contiguous around a radially outer surface of the primary seal.

Optionally one of the upper or lower bodies comprises a port to allow fluid communication between the channel intermediate the primary seal and the primary seal carrier, and the external environment.

Optionally the radially overlapping portions of the primary seal and the primary seal carrier prevent movement of the primary seal in one axial direction, but not in an opposing axial direction. Optionally movement of the primary seal with respect to the primary seal carrier in the opposing axial direction is restricted, but not prevented, by a retaining device, which is optionally annular, and is optionally a circlip or C-clip. Optionally the retaining device is fitted to the primary seal carrier after the primary seal has been coupled to the primary seal carrier.

Optionally the primary seal carrier comprises at least two secondary seals. Optionally the one or more secondary seals are annular, and optionally the secondary seals are disposed on opposing axial surfaces of the primary seal carrier. Optionally the secondary seals are formed from a non-metallic material, optionally an elastomeric material, optionally a thermoplastic such as PEEK. Optionally the secondary seals have a circular profile, and are optionally recessed into one or more surfaces of the primary seal carrier, optionally within dovetail-shaped recesses. Optionally the secondary seals provide a secondary full-pressure seal, in addition to the seal provided by the primary seal, optionally indefinitely in the event of failure of the primary seal. Optionally the secondary seals seal the low-pressure side of the primary seal from the external environment, which optionally maintains an optimum pressure differential across the primary seal.

Optionally the primary seal carrier comprises at least one resilient portion which is optionally resiliently biased in a radial direction away from the primary seal toward a radially extended configuration, and which optionally engages with at least one portion of one of the first or second bodies when in the radially extended configuration. Optionally the at least one resilient portion of the primary seal carrier is movable radially relative to the primary seal from the radially extended configuration into a radially compressed configuration in which the at least one resilient portion is closer to the primary seal than in the radially extended configuration. Optionally when the at least one resilient portion of the primary seal carrier is engaged with at least one portion of one of the first or second bodies, the axial position of the primary seal carrier is fixed with respect to the first or second body. Optionally the primary seal carrier comprises more than one resilient portion. Optionally the resilient portions are spaced around a circumference of the primary seal carrier, optionally regularly spaced, optionally symmetrically spaced, optionally equidistantly spaced.

Optionally one of the first and second bodies can be detached from the other of the first and second bodies after the first and second bodies have formed a seal with the primary seal. Optionally the first body can be detached from the second body. Optionally when the first body detaches from the second body, the primary seal carrier, and the primary seal which is optionally engaged with the primary seal carrier, remains engaged with the second body. Optionally the second body comprises a guide ring, which can optionally be integrated with the second body, or can optionally be joined to the second body with one or more fixings, optionally with screws or bolts. Optionally the guide ring extends or protrudes in an axial direction from a surface of the second body, optionally in a direction substantially parallel to the direction of travel of the first body when it detaches from the second body. Optionally the guide ring is annular, and optionally has a greater diameter than both the primary seal and the primary seal carrier. Optionally the guide ring restricts the movement of the first body after it detaches from the second body to be substantially parallel to the axis of the conduit of the second body, optionally until the first body is removed from the second body by a distance approximately equal to the axial dimension of the guide ring.

According to another aspect of the present invention, there is provided a seal carrier for holding a seal in sealing relation between conduits passing through first and second body assemblies; the seal carrier having a latch element for latching the seal carrier to the second body assembly; the latch element having a follower on one face for following a guide profile of said first body assembly and a latch component on an opposing face for latching with said second body assembly, wherein on disengagement of said body assemblies, the interaction of the follower with the guide profile ensures the latch element is maintained at a position such that the latch component is engaged with the second body assembly until the first body assembly is at least partially axially separated from the second body assembly.

Optionally, the second body assembly comprises a main body and a ring member coupled thereto, the latch component engaging with a recess formed in said ring member.

Optionally, the latch element comprises an annular flange member.

Optionally the seal comprises a first sealing surface, and optionally the first body assembly comprises a second sealing surface. Optionally a seal is formed between the first sealing surface and the second sealing surface, and optionally the first sealing surface adheres to the second sealing surface when the seal is formed between the first sealing surface and the second sealing surface. Optionally when the second body assembly is latched with the seal carrier, the first body assembly can move axially between first and second axial positions while the axial position of the seal carrier is fixed. Optionally the adhesion between the first and second sealing surfaces is overcome when the first body assembly moves axially between the first and second axial positions while the axial position of the seal carrier is fixed.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying Figures. Still other aspects, features, and advantages of the present invention are readily apparent from the entire description thereof, including the Figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

DETAILED DESCRIPTION OF THE DRAWINGS

Figure 1A:
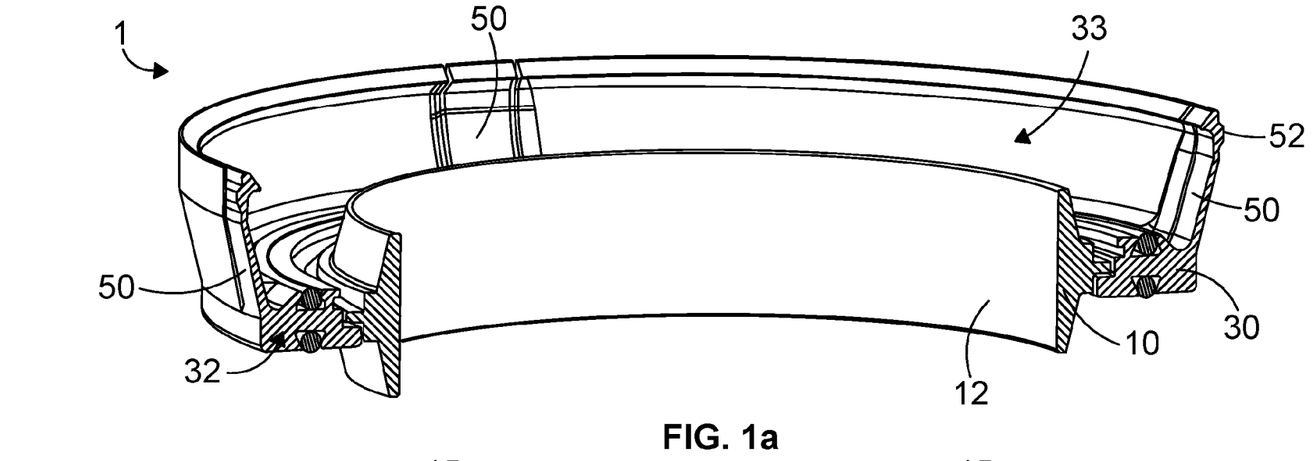
FIGS. 1a and 1b are respectively perspective section and side elevation views of an example of a gasket assembly, showing a primary seal coupled to a primary seal carrier in FIG. 1a, and a complete gasket assembly in FIG. 1b with a sealed conduit passing through upper and lower bodies.
Figure 1B:
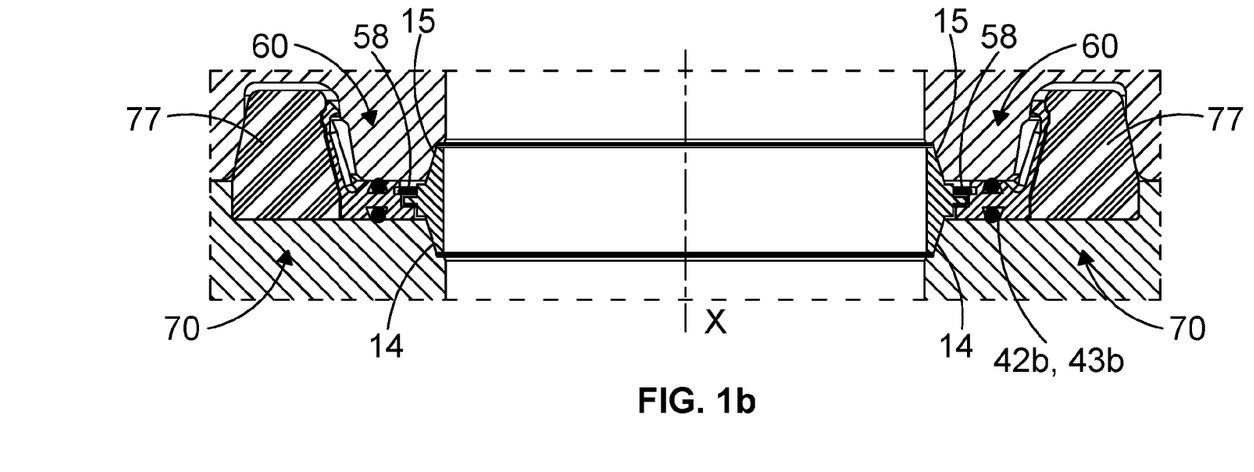

Referring now to the drawings, a gasket assembly 1 in accordance with one example of the invention is shown in FIGS. 1a and 1b. The gasket assembly 1 comprises a primary seal 10 and primary seal carrier 30, and is shown in FIG. 1b sealing between conduits 62 and 72 (shown in FIG. 5a) passing through upper body 60 and lower body 70 respectively.

Figure 2A:
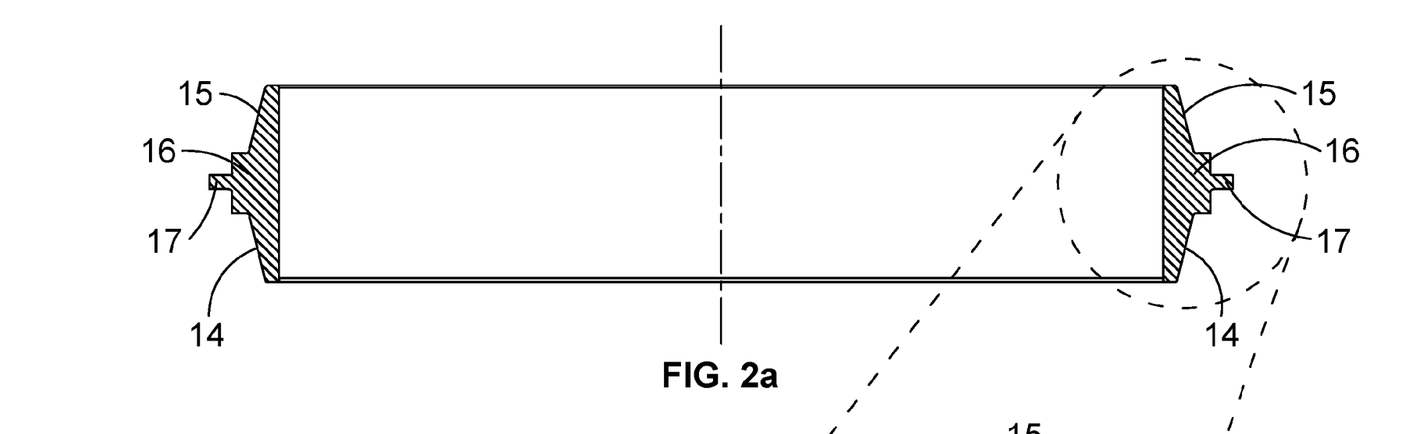
FIG. 2a is a side elevation view of the primary seal.
Figure 2B:
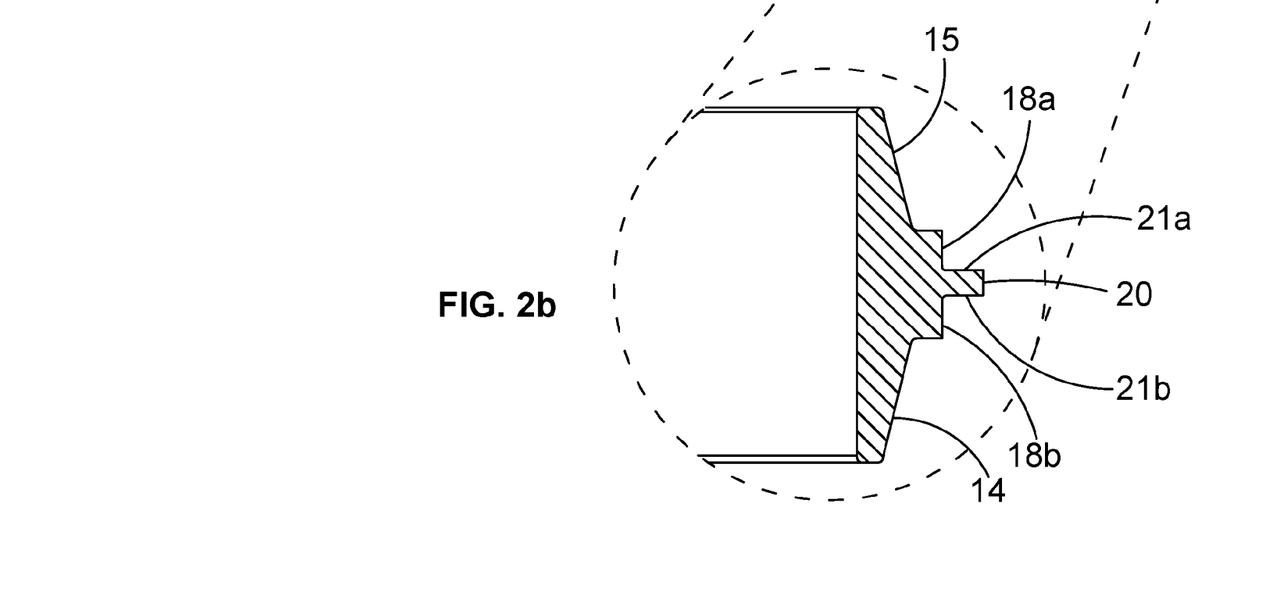
FIG. 2b is a detailed view of the sealing surfaces of the primary seal.

The primary seal 10 is shown in detail in FIGS. 2a and 2b, and is generally cylindrically shaped and has a bore with an axis X. In this example the diameter of the radially inner surface 12 (shown in FIG. 1a) of the primary seal 10 is constant, but in other examples the inner diameter of the primary seal may vary along its axial length. The radially outer surface of the primary seal 10 comprises a central rib 16 disposed axially intermediate first and second sealing faces 14, 15. In this example the first and second sealing faces 14, 15 on the radially outer surface of the primary seal 10 are symmetrical, and taper radially inwardly with respect to the axis X of the bore of the primary seal, toward the axial ends of the primary seal. Also in this example the radially inward taper of the first and second sealing faces 14, 15 has a constant gradient, and more particularly, in this example, the first and second sealing faces 14, 15 are frustoconical. In other examples, the first and second sealing faces 14, 15 may instead have a non-linear profile, in contrast to the linear profile of the first and second sealing surfaces in this example best seen in FIG. 2b. In other words, in this example, the outer diameter, and therefore radial thickness, of the primary seal 10 is greatest in the region of the central rib 16, and decreases in an axial direction toward the axial ends of the first and second sealing faces 14, 15.

The rib 16 of the primary seal 10 extends radially outwardly from the outer surface of the primary seal. In this example, the rib 16 is disposed equidistantly intermediate the axial ends of the primary seal, and has a constant outer diameter OD(R). The rib 16 further comprises a lip 17 which protrudes radially from the outer surface of the rib 16. In this example the lip 17 is disposed generally equidistantly intermediate the axial ends of the rib 16, and also has a constant outer diameter OD(L), where OD(L) is greater than OD(R). Therefore, in this example the lip 17 approximately bisects the outer surface of the rib 16 into two axially-orientated faces 18a, 18b, each having a diameter OD(R). The lip 17 also has a axially-orientated face 20 of diameter OD(L), and two radially-orientated faces 21a, 21b. In this example the axially-orientated faces 18a, 18b and 20 of the rib 16 and lip 17 respectively are parallel to the axis X of the primary seal 10, and the radially-orientated faces of 21a, 21b of the lip 17 are perpendicular to the axially-orientated faces 18a, 18b and 20 of the rib 16 and lip 17, and are also perpendicular to the axis X of the primary seal.

Figure 3A:
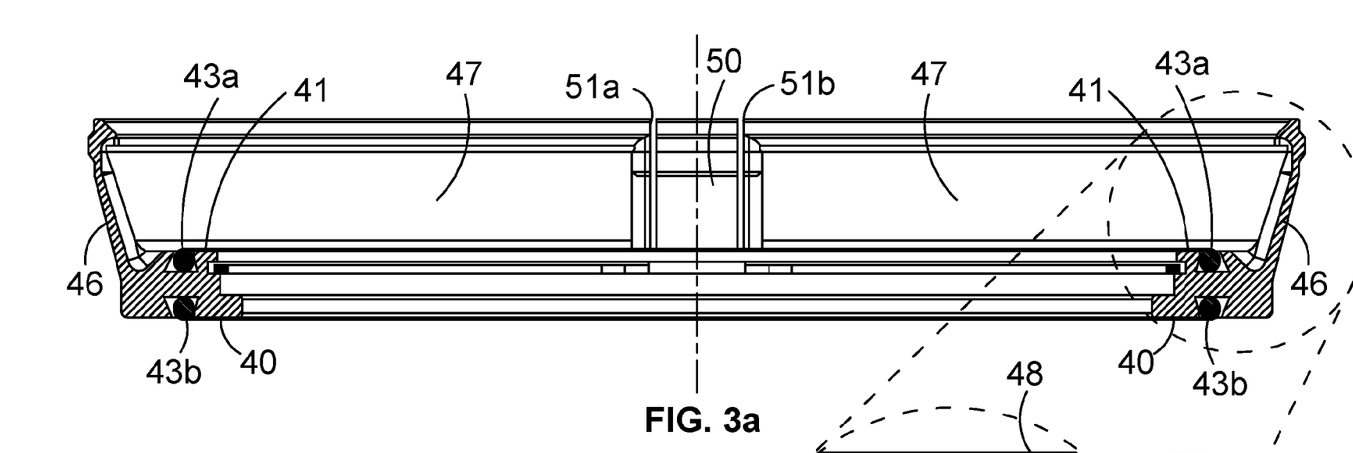
FIG. 3a is a side elevation view of the primary seal carrier.
Figure 3B:
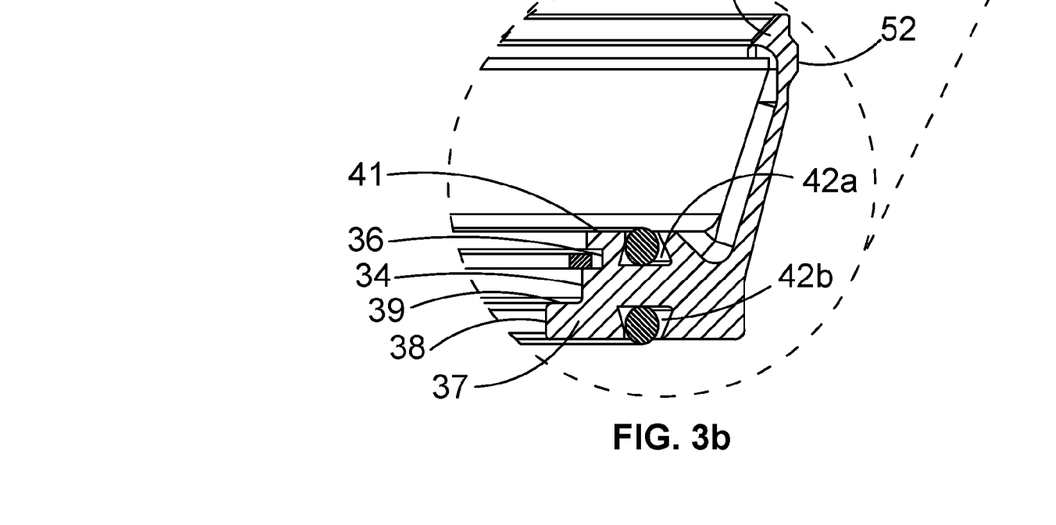
FIG. 3b is a detailed view of the secondary seals of the primary seal carrier.

The primary seal carrier 30 is shown in detail in FIGS. 3a and 3b and is also generally cylindrically shaped and has a bore with an axis coaxial to the axis X of the primary seal 10. The primary seal carrier 30 generally comprises a radially inner portion 32 and a radially outer wall 33, as best seen in FIG. 1a.

The inner portion 32 of the primary seal carrier 30 has a radially inner face 34, which in this example is also parallel to the axes of both the primary seal 10 and the primary seal carrier, and has a constant inner diameter ID(IF). Also in this example a recess 36 is disposed toward, but not adjacent to, an axial edge of the inner face 34, and a lip 37 is disposed adjacent to the opposing axial edge of the inner face. The recess 36 has a greater inner diameter ID(R) than the inner diameter ID(IF) of the inner face 34, while the lip 37 has a lesser inner diameter ID(L) than the inner diameter ID(IF) of the inner face.

The inner portion 32 also has first and second surfaces 40, 41 which in this example are generally parallel to each other, and which are perpendicular to the axes of both the primary seal 10 and the primary seal carrier 30. The first and second surfaces 40, 41 each comprise a secondary seal recess 42a and 42b. In this example there are two secondary seal recesses 42a, 42b, which are generally similar to each other, with one secondary seal recess disposed in each of first and second surfaces 40, 41.

In other examples, there may be more than one secondary seal recess in either or both of the first and second surfaces 40, 41. Also in this example, both secondary seal recesses 42a, 42b have a greater radial dimension at the base of each recess than at the opening of each recess, or in other words the secondary seal recesses 42a, 42b have a trapezoidal or dovetail profile, but in other examples the secondary seal recesses 42a, 42b could have any suitable profile, for example a square profile.

Secondary seals 43a, 43b are disposed within each of the secondary seal recesses 42a, 42b. In this example the secondary seals 43a, 43b are annular and have a circular profile, and are formed from an elastomeric material, but in other examples the secondary seals may have any suitable geometry, and may be formed from a non-elastomeric material.

In this example the outer wall 33 of the primary seal carrier 30 extends axially, and slightly radially outwardly, away from the inner portion 32. Therefore, in this example, the radially outer surface 46 of the outer wall 33 is generally frustoconical, and also in this example the radial thickness of the outer wall between the radially inner and outer surfaces 46, 47 of the outer wall tapers toward the axial edge of the outer wall. The outer wall 33 also comprises a radially inward profile or rim 48, disposed toward the axial edge of the primary seal carrier 30, which is contiguous around an inner circumference of the outer wall 33.

Also in this example, the primary seal carrier 30 comprises four resilient tongues 50 disposed in the outer wall 33. Each resilient tongue 50 is formed from first and second axial slots (or notches) 51a, 51b through the outer wall 33 (and rim 48 of the outer wall), and which extend from the axial edge of the outer wall toward the inner portion 32, but which do not extend into or through the inner portion 32. Furthermore, in this example, the resilient tongues 50 formed by the slots 51a, 51b are disposed equidistantly around the circumference of the primary seal carrier 30, but in other examples there may be more or fewer than four resilient tongues 50, and the resilient tongues need not be disposed either equidistantly or symmetrically, around the circumference of the primary seal carrier.

In this example each resilient tongue 50 is resiliently biased such that the outer and inner surfaces of each resilient tongue are radially aligned with the outer and inner surfaces 46, 47 of the outer wall 33. Also in this example a lug 52 is disposed on the outer surface of each resilient tongue 50, toward but not adjacent to the axial edge of the outer wall 33. Each lug 52 is an outward radial protrusion from the outer surface of each resilient tongue 50, which extends radially beyond the outer surface 46 of the outer wall 33. In this example, the outer wall 33 itself does not have any corresponding radial protrusions, and therefore the lugs 52 of each resilient tongue 50 form the greatest outer diameter of the primary seal carrier 30.

Figure 5A:
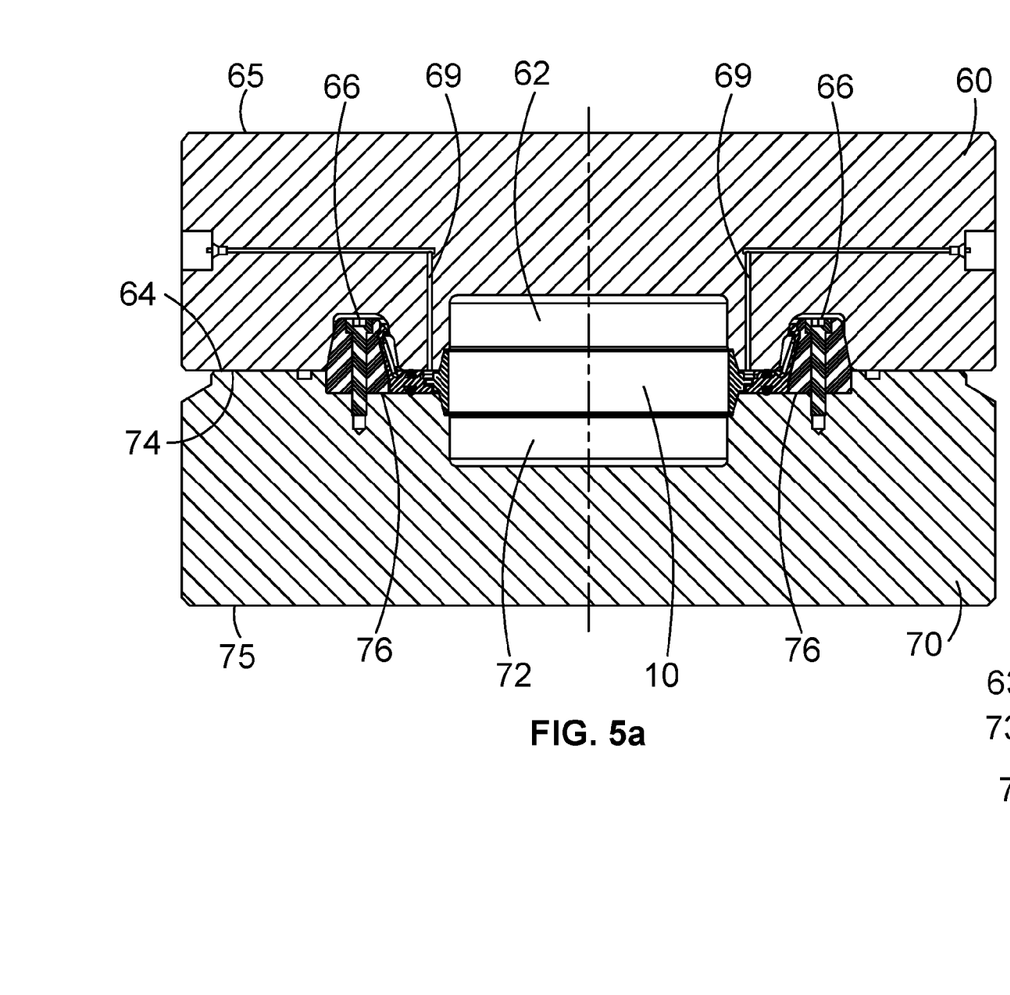
FIG. 5a is a side elevation view of the primary seal and primary seal carrier in position between the upper and lower bodies.
Figure 5B:
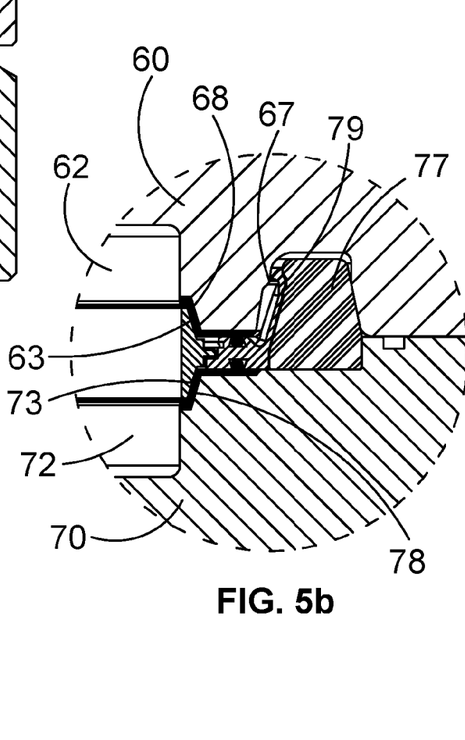
FIG. 5b is a detailed view of the lugs of the primary seal carrier engaged with the recess of the guide ring.

The upper and lower bodies 60, 70 are shown in FIGS. 5a and 5b. In this example the upper and lower bodies 60, 70 are generally cylindrical and each has an axis coaxial to the axis X of the primary seal 10. Also in this example each of the upper and lower bodies 60, 70 are formed from a material such as steel alloy and have an axial conduit 62, 72 that passes through each upper and lower body respectively between a first axial end surface 64, 74 and an opposing second axial end surface 65, 75. In this example the conduits 62, 72 comprise a single cylindrical axial bore disposed through the centre of each upper and lower body 60, 70 from the first axial end surfaces 64, 74 of the upper and lower bodies respectively.

In this example the first axial surface 74 of the lower body 70 has a circular recess 76 which is adjacent to, and extends radially from, the axial conduit 72. Also in this example a portion of the inner surface 73 of the axial conduit 72 adjacent to the recess 76 is not perpendicular to the first end surface 74 of the lower body 70, but is tapered slightly radially outwardly, such that the opening of the axial conduit 72 has a slightly greater inner diameter than an inner portion of the axial conduit. Furthermore, in this example, the boundary region between the axial conduit 72 and the recess 76 comprising the tapered portion 73 of the axial conduit 72 and the radially innermost portion of the recess 76 is formed from an inlay 78 of material that is distinct from the material of the lower body 70, as best seen in FIG. 5b. In this example the inlay 78 is formed from a corrosion-resistant metal alloy such as Inconel, but in other examples the inlay 78 may be formed from another material suitable for forming a sealing surface with the primary seal 10, or alternatively, the sealing surface of the lower body 70 may be formed from the same material as the lower body itself.

Also in this example an annular guide ring 77 is disposed within the recess 76 and is fixed to the lower body 70. The guide ring 77 has a generally trapezoidal profile and extends axially beyond the first surface 74 of the lower body 70. In this example the outer diameter of the guide ring 77 within the recess 76 is approximately equal to the inner diameter of the recess 76, such that the radially outer surface of the guide ring 77 abuts the radially inner surface of the recess 76. Also in this example the guide ring 77 is formed from a steel alloy material, but in other examples the guide ring 77 may be formed from other materials, or alternatively, may be formed as an integral part of the lower body 70.

The guide ring 77 in this example further comprises a recess or notch 79 disposed around an inner circumference of the guide ring, toward the axial end of the guide ring opposing the axial end of the guide ring within the recess 76. In this example the recess 79 is contiguous around the inner circumference of the guide ring 77, but in other examples the recess 79 may not be contiguous, or may not be present.

In this example the first axial surface 64 of the upper body 60 also has a circular recess 66, which in contrast to the recess 76 of the lower body 70, does not extend radially from the axial conduit 62, but is radially offset from the axial conduit 62. The recess 66 has a generally trapezoidal profile, and is shaped to admit the guide ring 77 of the lower body 70 and the outer wall 33 of the primary seal carrier 30 when the gasket assembly 1 is assembled, as will be explained below. Also in this example a portion of the inner surface 63 of the axial conduit 62 adjacent to the first end surface 64 of the upper body 60 is not perpendicular to the first end surface 64, but is tapered slightly radially outwardly, such that the opening of the axial conduit 62 has a slightly greater inner diameter than an inner portion of the axial conduit. Furthermore, in this example, the boundary region between the axial conduit 62 and the first end surface 64 comprising the tapered portion 63 of the axial conduit 62 and the radially innermost portion of the first end surface 64 is formed from an inlay 68 of material that is distinct from the material of the upper body 60, as also best seen in FIG. 5b. In this example the inlay 68 is formed from a corrosion-resistant metal alloy such as Inconel, but in other examples the inlay 68 may be formed from another material suitable for forming a sealing surface with the primary seal 10, or alternatively, the sealing surface of the upper body 60 may be formed from the same material as the upper body itself.

The upper body 60 in this example also comprises back seat ports 69 which are openings in the first end surface 64 of the upper body joined to conduits which initially pass axially through the upper body 60, as best seen in FIG. 5a. The conduits are joined to second openings on an external surface of the upper body 60. The opening of the back seat port 69 in the first end surface 64 is disposed radially intermediate the axial conduit 62 and the recess 66. In this example, there are two back seat ports 69, but in other examples there may be more or fewer back seat ports, or the back seat ports may not be present.

The gasket assembly 1 in this example is assembled according to the following sequence of steps. The axis X of the primary seal 10 is first aligned with the axis of the primary seal carrier 30, and the primary seal 10 moved or pushed axially toward the primary seal carrier 30, until the radially-orientated face 21b of the lip 17 of the primary seal come into contact with the radially-orientated face 39 of the inner portion lip 37 of the primary seal carrier. Since the outer diameter OD(L) of the lip 17 of the primary seal 10 is greater than the inner diameter ID(L) of the lip 37 of the primary seal carrier 30, the primary seal is prevented from further axial movement with respect to the primary seal carrier once the lip 17 comes into contact with the radially-orientated face 39. In this example, the axial dimension of the lip 17 is less than the axial distance between the recess 36 and the lip 37 of the inner portion 32 of the primary seal carrier 30.

A retaining ring 58 is then fitted into the recess 36 in the inner face 34 of the primary seal carrier 30. In this example the retaining ring 58 is a circlip or C-clip in the form of a resilient split ring which may be fitted by reducing the outer diameter of the retaining ring 58 by means of an external radially inward force, and then axially aligning the retaining ring with the recess 36 of the inner face 34, and then releasing the retaining ring. The retaining ring 58 resiliently expands into the recess 36, and further axial movement of the retaining ring 58 is therefore prevented.

Figure 4A:
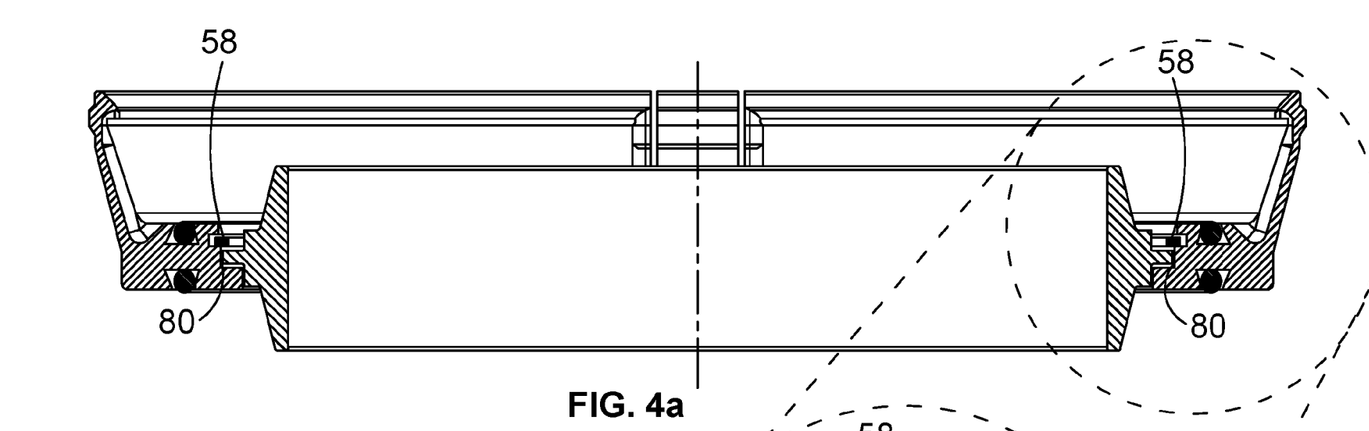
FIG. 4a is a side elevation view of the primary seal coupled to the primary seal carrier.
Figure 4B:
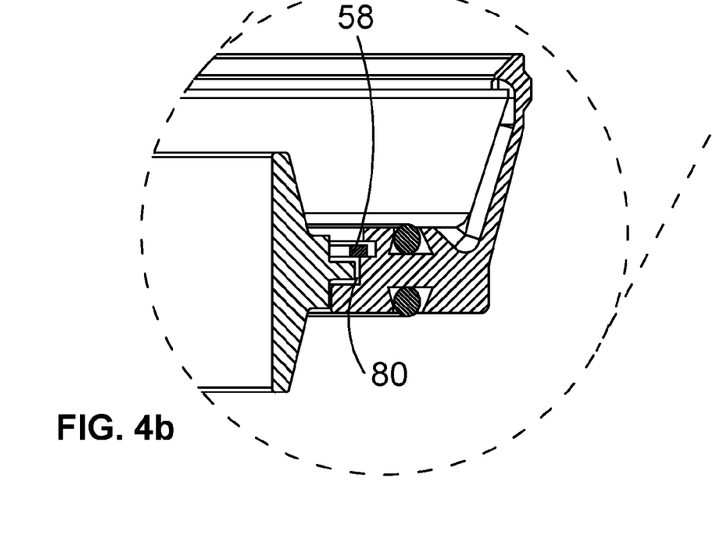
FIG. 4b is a detailed view of the coupling and channel between the primary seal and the primary seal carrier.

After the retaining ring 58 is fitted into the recess 36 of the primary seal carrier 30, and the primary seal 10 is therefore coupled to the primary seal carrier 30, the primary seal remains free to move slightly with respect to the primary seal carrier in both axial and radial directions, or in other words, there remains a degree of play between the primary seal and the primary seal carrier. As is best seen in FIG. 4b, the outer diameter OD(R) of the rib 16 of the primary seal 10 is slightly less than the inner diameter ID(L) of the lip 37 of the primary seal carrier 30, and the outer diameter OD(L) of the lip 17 of the primary seal is also slightly less than the inner diameter ID(IF) of the inner face 34 of the primary seal carrier. Therefore, radial movement of the primary seal is permitted until either the axially-orientated faces 18a, 18b of the rib 16 abut either the axially-orientated face 38 of the lip 37, or the retaining ring 58, or alternatively until the axially-orientated face 20 of the lip 17 abuts the inner face 34 of the primary seal carrier. Similarly, axial movement of the primary seal is permitted until either of the radially-orientated faces 21a, 21b of the lip 17 of the primary seal 10 abut either the radially-orientated face 39 of the lip 37 of the primary seal carrier 30, or the retaining ring 58.

Once the primary seal 10 has been coupled to the primary seal carrier 30, the axis of the primary seal carrier is aligned with the axis of the conduit 72 of the lower body 70, and the primary seal carrier is moved or pushed axially toward the lower body and into the recess 76 in the first end surface 74 of the lower body. As the outer wall 33 of the primary seal carrier 30 moves axially past the radially inner surface of the guide ring 77, the lugs 52 of the resilient tongues 50 contact the radially inner surface of the guide ring 77, which urges the resilient tongues 50 radially inwardly. As the primary seal carrier continues to move axially past the guide ring 77, the lugs 52 of the resilient tongues 50 then axially align with the recess 79 of the guide ring 77, allowing the resilient tongues 50 to expand radially outwards and return to their resiliently biased resting position. Once the lugs 52 of the resilient tongues 50 are engaged within the recess 79 of the guide ring 77, axial movement of the primary seal carrier 30 in the opposite axial direction, away from the lower body 70, is substantially prevented.

As the primary seal carrier 30 is moved or pushed axially toward the lower body 70 and into the recess 76 in the first end surface 74 of the lower body, the first sealing face 14 of the primary seal 10 also contacts the tapered portion 73 of the axial conduit 72. As the primary seal carrier 30 is moved or pushed into its final position in the recess 76 of the lower body 70, the freedom of movement, or play, of the primary seal 10 with respect to the primary seal carrier allows the first sealing face 14 of the primary seal to precisely align with the inlaid sealing surface 78 of the lower body, which allows the formation of a reliable seal between the first sealing face and the tapered portion of the lower body. Simultaneously, the secondary seal 43*b* of the primary seal carrier 30 also contacts and forms a seal with the inlaid sealing surface 78 of the lower body.

Once the primary seal carrier 30 has been positioned within the recess 76 in the first end surface 74 of the lower body 70, and the lugs 52 of the resilient tongues 50 are engaged within the recess 79 of the guide ring 77, the axis of the conduit 62 of the upper body 60 is then aligned with the axis of the conduit 72 of the lower body 70, and the upper body 60 is moved or pushed axially toward the lower body 70. As the upper body 60 approaches the lower body 70, the radially inner and outer surfaces of the recess 66 of the upper body engage with the radially inner and outer surfaces of the guide ring 77 of the lower body, orientating the upper body with respect to the lower body so that the second sealing surface 15 of the primary seal 10 contacts the inlaid sealing surface 68 of the upper body. Simultaneously, the secondary seal 43*a* of the primary seal carrier 30 also contacts and forms a seal with the inlaid sealing surface 68 of the upper body 60.

After the upper and lower bodies 60, 70 have been fully moved or pushed axially toward each other, an axial compression force is then applied to the upper and lower bodies. The axial compression form squeezes the first and second sealing surfaces 14, 15 of the primary seal 10, and the first and second secondary seals 43*a*, 43*b* of the primary seal carrier 30, against the inlaid sealing surfaces 68, 78 of the upper and lower bodies 60, 70 respectively. The compression of the sealing surfaces of the primary seal carrier 10 and the upper and lower bodies 60, 70 completes the formation of the primary and secondary seals.

In this example, the freedom of movement of the primary seal 10 with respect to the primary seal carrier 30 prior to the joining of the upper and lower bodies 60, 70 causes a cavity or channel 80 to remain between the rib 16 and lip 17 of the primary seal carrier, and the inner face 34 of the primary seal carrier. The channel 80 is a closed cavity and is sealed from both the axial conduits 62, 72 of the upper and lower bodies 60, 70 and the external environment, by the seals formed between the first and second sealing surfaces 14, 15 of the primary seal carrier 10, the secondary seals 43*a*, 43*b* of the primary seal carrier 30, and the inlaid sealing surfaces 68, 78 of the upper and lower bodies.

During operation of the gasket assembly 1, the back seat ports 69 are in fluid communication with the channel 80. Before the sealed axial conduit 62, 72 passing through the upper and lower bodies 60, 70 is typically pressurised prior to conveying high-pressure and/or high-temperature fluids or gases, the back seat ports 69 can optionally be used to apply a relatively low pressure fluid to the channel 80 between the first and second sealing surfaces 14, 15 of the primary seal carrier 10, the secondary seals 43*a*, 43*b* of the primary seal carrier 30, and the inlaid sealing surfaces 68, 78 of the upper and lower bodies. This can be used as an indication of the integrity of the primary and secondary seals 10, 43*a*, 43*b*, since if subsequent pressure monitoring indicates that the primary seal in particular is able to maintain a seal against low-pressure fluid, where the pressure differential across the primary seal is applied in the opposite direction (i.e. pressure in channel 80 is greater than bore pressure in conduit 62, 72), it is likely that the primary seal 10 will also be reliable when exposed to a high pressure differential in the direction expected during normal operations (i.e. bore pressure in conduit 62, 72 greater than pressure in channel 80).

After the completion of any optional low-pressure testing, the sealed axial conduit 62, 72 can be pressurised, and the conduit 62, 72 can then be used to convey high-pressure and/or high-temperature liquids or gases. During normal operations, the back seat ports 69 can also be used to measure or monitor physical parameters such as absolute pressure, or relative pressure change over time, of the channel 80 between the first and second sealing surfaces 14, 15 of the primary seal carrier 10, the secondary seals 43*a*, 43*b* of the primary seal carrier 30, and the inlaid sealing surfaces 68, 78 of the upper and lower bodies. Any unexpected change in monitored parameters can indicate a failure of the primary seal 10, allowing appropriate action or intervention to be taken. In the event of a failure of the primary seal 10, the secondary seals 43*a*, 43*b* can provide an alternative seal to maintain the overall seal between the conduit 62, 72 and the external environment. For example, if the primary seal 10 fails, pressure monitoring of the back seat ports 69 can indicate the failure of the primary seal to an operator, while the second seals 43*a*, 43*b* maintain the overall seal, thus providing time for remedial action to be taken.

The gasket assembly 1 in this example also allows for the upper and lower bodies 60, 70 to be removed from each other, after being sealed as described previously. Once a seal has been formed between the first and second sealing surfaces 14, 15 of the primary seal carrier 10 and the inlaid sealing surfaces 68, 78 of the upper and lower bodies, the sealing surfaces may adhere to each other even after the axial compression across the sealing surfaces that maintains the seal is released. In this example, when removing the upper body 60 from the lower body 70, any adhesion between the second sealing surface 15 and the inlaid sealing surface 68 may cause the primary seal 10, and therefore also the primary seal carrier 30, to be removed with the upper body 60. In this example, the recess 66 of the upper body also comprises a guide profile including a radial protrusion 67, as shown in FIG. 5*b*, which engages with a follower in the form of rim 48 of the tongues 50 of the primary seal carrier 30. As the upper body 60 is initially released from the lower body 70, the radial protrusion 67 of the upper body 60 exerts a radially outwardly directed force on the rim 48 of the resilient tongues 50 of the primary seal carrier 30, which prevents the resilient tongues from deflecting radially inwardly, thereby urging the lugs 52 of the resilient tongues to remain engaged in the recess 79 of the guide ring 77. The primary seal carrier 30, and therefore also the primary seal 10, will remain stationary as long as the lugs 52 of the resilient tongues 50 remain engaged in the recess 79, the element 46 acting as a latch ensuring the carrier 30 is held in place on the lower body. Therefore, any adhesion between the second sealing surface 15 and the inlaid sealing surface 68 as the upper body 60 moves away from the lower body 60 can be overcome, and the sealing surfaces separated.

After the upper body 60 has moved axially a short distance away from the lower body 70, the radial protrusion 67 of the upper body has also moved axially past the rim 48 of the resilient tongues 50 of the primary seal carrier 30. Therefore, the resilient tongues 50 can again be deflected radially inwardly, for example by an external tool, in order to allow the primary seal carrier 30, and therefore also the primary seal 10, to be removed from the lower body 70.

The invention claimed is:

1. A seal carrier for holding a seal in sealing relation between conduits passing through first and second body assemblies;
    the seal carrier having a latch element for latching the seal carrier to the second body assembly;
    the latch element comprising a resilient tongue having a follower on one face for following a guide profile of said first body assembly and a latch component on an opposing face for latching with said second body assembly,
    wherein on disengagement of said body assemblies, the interaction of the follower with the guide profile prevents the resilient tongue from deflecting inwardly thereby ensuring that the latch element is maintained at a position such that the latch component is engaged with the second body assembly until the first body assembly is at least partially axially separated from the second body assembly, thereby allowing the resilient tongue to deflect inwardly to release the latch component.

2. A seal carrier as claimed in claim 1, wherein the latch component is configured to engage a recess formed in a ring member of the second body assembly.

3. A seal carrier as claimed in claim 1, wherein the latch element comprises an annular flange member.

4. A seal carrier as claimed in claim 1, wherein the seal carrier is provided within a gasket assembly for sealing between conduits passing through said first and second body assemblies, the gasket assembly comprising:
    a primary seal, wherein the primary seal comprises a first sealing surface adapted to form a seal with the first body assembly, and a second sealing surface adapted to form a seal with the second body assembly; and
    wherein the primary seal is coupled to the seal carrier, and wherein the seal carrier comprises one or more secondary seals, the one or more secondary seals being adapted to form a seal with one or more of the first and second body assemblies.

5. A seal carrier as claimed in claim 4, wherein the primary seal has a central axis, and wherein the coupling of the primary seal and the seal carrier is adapted to restrict, but not prevent, axial movement of the primary seal with respect to the seal carrier.

6. A seal carrier as claimed in claim 4, wherein the primary seal is annular, and wherein the coupling of the primary seal and the seal carrier is adapted to restrict, but not prevent, radial movement of the primary seal with respect to the seal carrier.

7. A seal carrier as claimed in claim 4, wherein the coupling of the primary seal with respect to the seal carrier is a movable coupling which permits multi-directional alignment of at least one of the first and second sealing surfaces of the primary seal with at least one of the first and second body assemblies.

8. A seal carrier as claimed in claim 4, wherein the gasket assembly further comprises a channel between a coupling surface of the primary seal and a coupling surface of the seal carrier.

9. A seal carrier as claimed in claim 8, wherein the channel is a closed cavity between the primary seal, the one or more secondary seals, and the two body assemblies.

10. A seal carrier as claimed in claim 8, wherein the channel permits fluid communication between a surface portion of the first body assembly and a surface portion of the second body assembly.

11. A seal carrier as claimed in claim 10, wherein at least one of the body assemblies further comprises a port with an opening in the surface portion of the first body assembly or the surface portion of the second body assembly.

12. A seal carrier as claimed in claim 11, wherein the port is in fluid communication with the channel.

13. A seal carrier as claimed in claim 4, wherein the primary seal and the seal carrier are formed from different materials.

14. A seal carrier as claimed in claim 13, wherein the material forming the primary seal carrier is of lower value than the material forming the primary seal.

15. The seal carrier as claimed in claim 1, wherein the follower comprises a rim and the latch component comprises a lug spaced from the follower along the latch element.

* * * * *